(12) United States Patent
Sangashetty et al.

(10) Patent No.: US 12,088,472 B2
(45) Date of Patent: Sep. 10, 2024

(54) SYSTEM AND METHOD OF MANAGING EVENTS OF TEMPORAL DATA

(71) Applicant: UST Global (Singapore) Pte. Limited, Singapore (SG)

(72) Inventors: Manjunath Shantappa Sangashetty, Bengaluru (IN); Jyothi Rupa Sugavaneswaran, Bengaluru (IN); Nisha Parameswaran Kurur, Trivandrum (IN); Ranjith Mohanakumaran Nair, Thiruvananthapuram (IN)

(73) Assignee: UST Global (Singapore) Pte. Limited, Singapore (SG)

( * ) Notice: Subject to any disclaimer, the term of this patent is extended or adjusted under 35 U.S.C. 154(b) by 0 days.

(21) Appl. No.: 17/821,329

(22) Filed: Aug. 22, 2022

(65) Prior Publication Data

US 2023/0336434 A1    Oct. 19, 2023

(30) Foreign Application Priority Data

Apr. 18, 2022 (IN) .............................. 202211022800

(51) Int. Cl.
*H04L 41/147* (2022.01)
*H04L 43/0829* (2022.01)
*H04L 43/087* (2022.01)

(52) U.S. Cl.
CPC ........ *H04L 41/147* (2013.01); *H04L 43/0829* (2013.01); *H04L 43/087* (2013.01)

(58) Field of Classification Search
CPC . H04L 41/147; H04L 43/0829; H04L 43/087; H04L 41/064
See application file for complete search history.

(56) References Cited

U.S. PATENT DOCUMENTS

| | | | |
|---|---|---|---|
| 7,292,960 B1 | 11/2007 | Srinivasa et al. | |
| 8,046,322 B2* | 10/2011 | Wang | G06F 16/2465 707/778 |
| 8,538,908 B2 | 9/2013 | Li et al. | |
| 9,386,030 B2 | 7/2016 | Vashist et al. | |
| 11,405,103 B2* | 8/2022 | Xie | H04L 41/12 |
| 2013/0235747 A1* | 9/2013 | Le | H04L 45/70 370/252 |
| 2016/0239756 A1* | 8/2016 | Aggour | G05B 23/0221 |
| 2016/0359697 A1* | 12/2016 | Scheib | H04L 9/3239 |

(Continued)

FOREIGN PATENT DOCUMENTS

WO    2018005012 A1    1/2018

*Primary Examiner* — Schquita D Goodwin
(74) *Attorney, Agent, or Firm* — Workman Nydegger

(57) ABSTRACT

The present invention provides a system and method of managing events of temporal data. The method may include receiving, by a receiving module 510, at least one current event related to the temporal data. The method may include identifying, by an identification module 512, at least one predefined feature of interest of the at least one current event. The method may include correlating, by a correlation module 514, the at least one current event with one or more clusters of events based on the at least one predefined feature of interest, in one of a real-time manner and a scheduled manner. Subsequently, the method may include predicting at least one future event in one of a real-time manner and a scheduled manner.

20 Claims, 6 Drawing Sheets

(56) References Cited

U.S. PATENT DOCUMENTS

| | | | |
|---|---|---|---|
| 2017/0070414 A1* | 3/2017 | Bell | H04L 43/16 |
| 2017/0111233 A1* | 4/2017 | Kokkula | H04L 43/08 |
| 2019/0215230 A1* | 7/2019 | Mermoud | H04L 41/16 |
| 2019/0268215 A1* | 8/2019 | Tellado | H04L 41/0672 |
| 2019/0320383 A1* | 10/2019 | Gardner | H04W 4/42 |
| 2019/0342145 A1* | 11/2019 | Chen | H04L 41/12 |
| 2021/0167852 A1* | 6/2021 | Xie | H04B 10/0793 |
| 2021/0168042 A1* | 6/2021 | Mijumbi | H04L 41/147 |
| 2021/0266781 A1* | 8/2021 | Alkurd | H04L 41/0823 |
| 2022/0329476 A1* | 10/2022 | Watfa | H04L 41/065 |
| 2022/0329524 A1* | 10/2022 | Sinha | H04L 41/0896 |
| 2023/0022401 A1* | 1/2023 | Amiri | G06N 20/00 |
| 2023/0078661 A1* | 3/2023 | Wei | G06F 16/35 |
| | | | 709/223 |
| 2023/0102002 A1* | 3/2023 | Garapati | H04L 41/0636 |
| | | | 709/223 |

* cited by examiner

SYSTEM AND METHOD OF MANAGING EVENTS OF TEMPORAL DATA

FIELD OF THE INVENTION

The present invention relates to systems and methods of managing events of temporal data.

BACKGROUND

As information technology (IT) operations move towards observability, events become a very important part of IT operation systems by providing useful insights about the current state of the entire infrastructure. For example, the event in the IT operation is associated with the Packet loss, node down, interface down, etc. When events enter the system, there should be a mechanism that can combine the related events into a single incident and assign it to a support engineer. Since all the related events are available as part of a single incident, it uncovers a broader picture which helps in resolving it faster. Hence, events correlation is an imperative feature for any enterprise-wide operations.

Most of the existing techniques in the art to correlate events can only handle grouping/correlation based on textual similarity. However, the existing techniques fail to catch relations among the events which are not textually similar. Though few offerings try to relate events not merely by textual similarity but by the non-textual affinity of the events. However, such techniques mandate manual specifications of the rules governing them. There can be a configured set of rules to take care of the non-textual affinity. However, it is not feasible to manually define an extensive collection of rules governing all possible groups of events.

Therefore, there is a need for a mechanism to overcome the above-discussed problems in the art.

SUMMARY

This summary is provided to introduce a selection of concepts, in a simplified format, that are further described in the detailed description of the invention. This summary is neither intended to identify key or essential inventive concepts of the invention nor is it intended for determining the scope of the invention.

An aspect of the present disclosure is to provide a method of managing events of temporal data. The method may include receiving at least one current event related to the temporal data. The method may include identifying at least one predefined feature of interest of the at least one current event. The method may include correlating the at least one current event based on the at least one predefined feature of interest, in one of a real-time manner and a scheduled manner. Subsequently, the method may include predicting at least one future event in one of a real-time manner and a scheduled manner.

Another aspect of the present disclosure is to provide a system for managing events of temporal data. The system may include a receiving module, an identification module, a correlation module, and a prediction module. The receiving module may be configured to receive at least one current event related to the temporal data. The identification module may be configured to identify at least one predefined feature of interest of the at least one current event. The correlation module may be configured to correlate the at least one current event with one or more clusters of events based on the at least one predefined feature of interest, in one of a real-time manner and a scheduled manner. The prediction module may be configured to predict at least one future event in one of real-time manner and scheduled manner.

To further clarify the advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF THE DRAWINGS

These and other features, aspects, and advantages of the disclosure will become better understood when the following detailed description is read with reference to the accompanying drawings in which like characters represent like parts throughout the drawings, wherein.

DETAILED DESCRIPTION OF FIGURES

Figure 1:
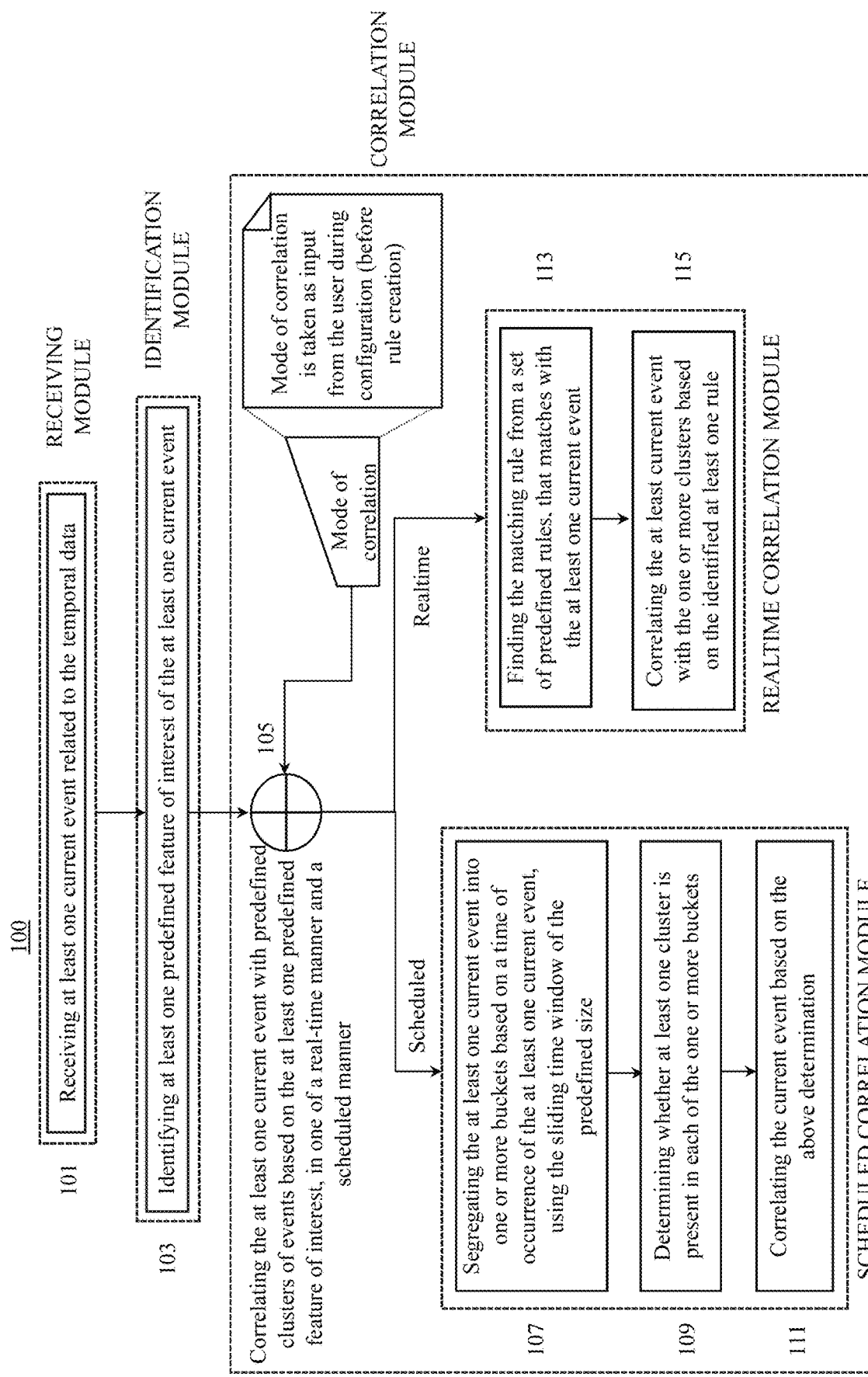
FIG. 1 illustrates a flow diagram depicting a method of managing events of temporal data, according to an embodiment of the present disclosure.

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates.

It will be understood by those skilled in the art that the foregoing general description and the following detailed description are explanatory of the invention and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The present invention provides a system and method for managing events of temporal data. Embodiments of the present disclosure will be described below in detail with reference to the accompanying figures.

FIG. 1 shows a flow diagram 100 depicting a method of managing events of temporal data, according to an embodiment of the present disclosure. The method may include receiving, at a step 101, at least one current event related to the temporal data. The event may include an alert or incident, or issues. Further, every received event may have various features related to events. For example, if the events are related to an IT field, then the events may have features such as event id, node name, service name, IP address, object type, and other similar associated information. Table 1 depicts a sample of the received events related to the temporal data. Each row in table 1 represents an event and the various parameters of table are characteristics of the event.

TABLE 1

Events(s)

| Event ID | Node Name | Service Name | IP Address | Object Type |
|---|---|---|---|---|
| 1 | Node-A | Packet Loss | 1.2.3.4 | Node |
| 2 | Node-B | IPSLA Packet Loss | 2.3.4.5 | UDP Jitter |
| 3 | Node-G | Interface Down | 4.5.6.7 | Interface |
| 4 | Node-A | Node Down | 1.2.3.4 | Node |
| 5 | Node-C | Interface Down | 3.4.5.6 | Interface |

The method may include identifying, at a step 103, at least one predefined feature of interest of the at least one current event. The identified predefined feature may be associated with at least one service node or service name. In particular, As shown in table 1, the received event can have a lot of information, and all information may not be always useful. Hence, useful information may be identified from the event. The information from the received at least one current event may be identified based on a use case. The identified information may be considered as a feature of interest. These features of interest may be used for grouping events and predicting future ones. For example, an event has features like the event message, node name, service name, IP address, etc. but the grouping and prediction may be based on node name and service name. Hence these are considered features of interest.

Moving ahead, the method may include correlating, at a step 105, correlating the at least one current event with one or more clusters of events based on the at least one predefined feature of interest, in one of a real-time manner, and a scheduled manner. The mode of correlation (scheduled or real-time) is configured prior to the rule creation.

Moving ahead, correlating the at least one current event in the scheduled manner, the method may include segregating, at a step 107, the at least one current event into one or more buckets based on the time of occurrence of the at least one current event, using a sliding time window of a predefined size. The sliding time window may include selecting a size (t) and a step size ($\Delta t$) of the time window and putting events occurring within the same window into a bucket based on the selected size (t) and the step size ($\Delta t$). This step is further explained in reference to FIG. 2.

Figure 2:
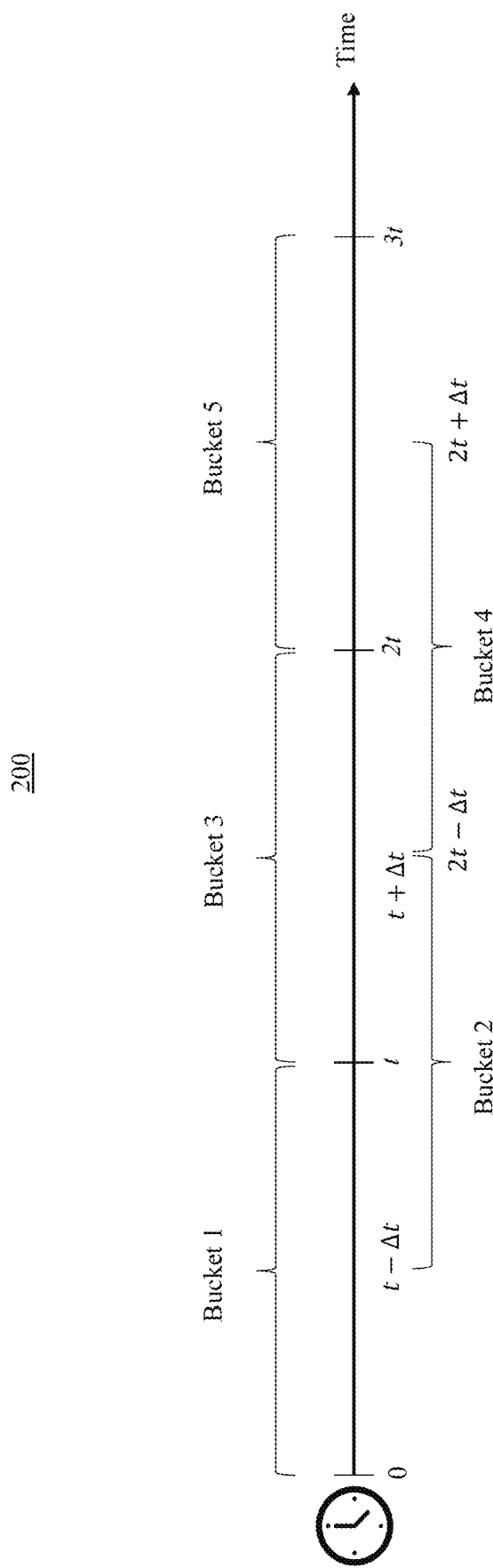
FIG. 2 illustrates a sliding window for segregating events into one or more buckets based on time of occurrence, according to an embodiment of the present disclosure.

FIG. 2 is line diagram 200 illustrating a sliding window for segregating the events into one or more buckets based on a time of occurrence, according to an embodiment of the present disclosure. The sliding window has a window size (t) and a step size ($\Delta t$). The events related to each other are put into one or more buckets based on the window size (t) and step size ($\Delta t$) of the sliding window. For example, if an event can be related to another one that occurs within a time vicinity of no more than 60 minutes, then the window size would be 60 minutes. Events occurring within window size could be related to one another. The sliding window ensures that all possible relation between events occurring at the end of one window and the ones occurring at the beginning of the next one is captured. Thus, the sliding window ensures continuity in capturing events. For example, if the window size is 20 minutes, without sliding windows, the event which occurred at, let's say, 18th minute and 22nd minute would be placed in different buckets even though they are only 4 minutes apart. Hence, related events would be placed in different buckets.

In an embodiment, the method may include determining at a step 109, whether the one or more clusters is present in each of the one or more buckets. In particular, the events may be grouped into buckets based on a time of occurrence. The one or more clusters may be obtained by generating at least one of similarity matrix and distance matrix for the at least one current event based on a set of predefined rules and using at least one of community detection technique and a clustering technique. The set of predefined rules is further explained in reference to FIG. 3.

Figure 3:
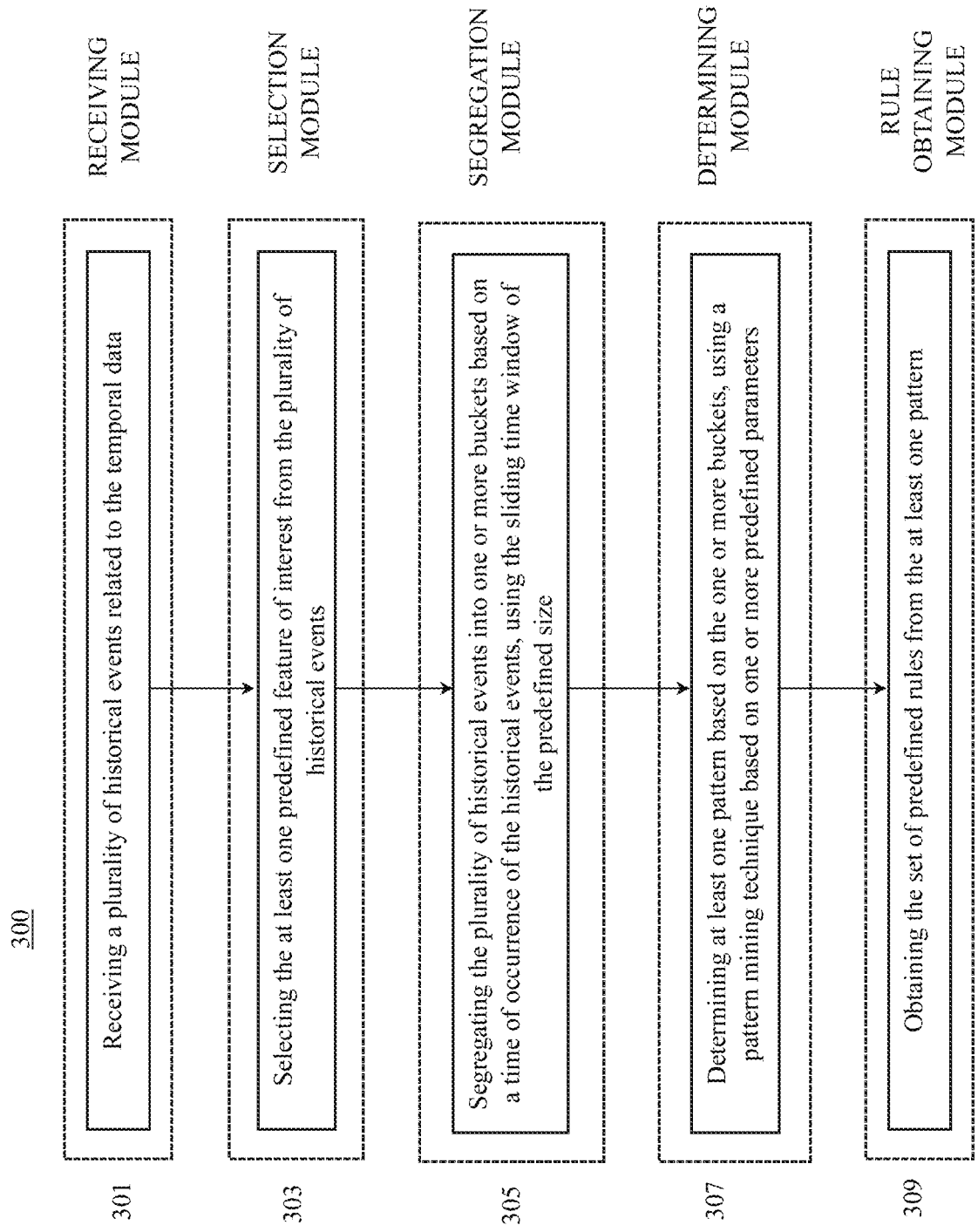
FIG. 3 illustrates a flow diagram depicting a method for obtaining a set of predefined rules, according to an embodiment of the present disclosure.

FIG. 3 shows a flow diagram 300 depicting a method for obtaining a set of predefined rules, according to an embodiment of the present disclosure. The method may include receiving, at a step 301 (receiving module), receiving a plurality of historical events related to the temporal data. The method may include pre-processing of the received plurality of historical events. Further, pre-processing may include but is not limited to the removal of junk or unwanted data, removal of non-alphanumeric characters, and deriving a field of interest based on multiple fields.

The method may include selecting, at a step 303 (selection module), the at least one predefined feature of interest from the plurality of historical events.

The method may include segregating, at a step 305 (segregation module), segregating the plurality of historical events into one or more buckets based on the time of occurrence of the historical events, using the sliding time window of the predefined size. The sliding time window may include selecting a size (t) and a step size ($\Delta t$) of the time window and putting events occurring within the same window into a bucket based on the selected size (t) and the step size (Δt). For example, if an event can be related to another one that occurs within a time vicinity of no more than 60 minutes, then the window size would be 60 minutes. Events occurring within window size could be related to one another. The sliding window ensures that all possible relation between events occurring at the end of one window and the ones occurring at the beginning of the next one is captured. Thus, the sliding window ensures continuity. For example, if the window size is 20 minutes, without sliding windows, the event which occurred at, let's say, 18th minute and 22nd minute would be placed in different buckets even though they are only 4 minutes apart.

Moving ahead, the method may include determining at a step 307 (determining module), at least one pattern based on the one or more buckets, using a pattern mining technique based on one or more predefined parameters. The one or more predefined parameters may include at least one minimum support and a maximum length of a rule. Further, the minimum support is indicative of a frequency threshold of the rule and the maximum length may be indicative of the maximum number of events involved in the rule. The minimum support may be determined using equation 1.

$$\text{support} = \frac{\text{transactions\_where\_items(s)\_occur}}{\text{total\_transactions}} \qquad \text{equation 1}$$

For instance, there are 100 sequences generated from the historical data, out of which, the sequence {(Node-J, Node Down), (Node-K, Interface Down)} appeared only 2 times, so the support of this sequence is 2/100=0.02. Such infrequent sequence can be avoided from consideration by defining minimum support to the desired value.

Subsequently, the method may include obtaining, at a step 309 (rule obtaining module), the set of predefined rules from the at least one pattern. The obtained set of predefined rules may be filtered based on the business use case. The filtered set of predefined rules may be stored for performing correlation of the current event, and prediction of at least one future event.

Table 2 depicts the set of predefined rules.

TABLE 2

Predefined rules

| Rule ID | Antecedents | Consequents | Confidence | Lift |
|---|---|---|---|---|
| r1 | ['Node-A - Packet Loss', 'Node-D - Interface Down', 'Node-E - IPSLA RTT/Latency'] | ['Node-A - Node Down'] | 94.77% | 2.32 |
| r2 | ['Node-A - Packet Loss'] | ['Node-A - Node Down', 'Node-C - Interface Down'] | 86.5% | 2.27 |
| r3 | ['Node-F - IPSLA Jitter'] | ['Node-C - Interface Down'] | 92.65% | 1.00 |
| r4 | ['Node-A - Packet Loss'] | ['Node-A - Node Down'] | 92.4% | 2.26 |
| r5 | ['Node-B - IPSLA Packet Loss'] | ['Node-D - Interface Down', 'Node-C - Interface Down'] | 82.06% | 1.08 |
| r6 | ['Node-A - Packet Loss', 'Node-A - Node Down'] | ['Node-C - Interface Down'] | 93.69% | 1.01 |
| . . . | . . . | . . . | . . . | . . . |
| Rn | [Node B - IPSLA Packet Loss'] | [Node G - Interface Down'] | 86.64% | 2.32 |

Each set of predefined rules may include at least one unique rule identification number, an antecedent, and a consequent. The unique rule identification number is a unique number assigned to each rule. A confidence score is the probability of the consequent happening provided that the antecedent had happened. A lift factor is associated with each rule and is indicative of the probability of the consequent and the antecedent occurring together. The lift value is determined using equation 2.

$$\text{Lift}(x\text{=}{>}y)\text{=}(\text{confidence}(x\text{=}{>}y))/(\text{support}(y)) \qquad \text{Equation 2}$$

When correlating the at least one current event in the scheduled manner, determining whether at least one current event is mentioned in one of the antecedents and the consequent of the at least one rule. Thereafter, the at least one rule may be filtered from the set of predefined rules based on the above determination. Further, at least one of similarity matrix and a distance matrix may be generated for the at least one current event based on the at least one filtered rule. Subsequently, the one or more clusters may be identified for the at least one rule by using at least one of community detection technique and a clustering technique.

Following clusters are obtained from applying the community detection/clustering techniques on the generated similarity matrix and distance matrix.
Cluster-1:
(Node-A, Packet Loss)
(Node-A, Node Down)
Cluster-2:
(Node-B, IPSLA Packet Loss)
Cluster-3:
(Node-G, Interface Down)
Cluster-4:
(Node-C, Interface Down)
Further, as per the business use case, the clusters obtained in every time window can be merged with the clusters obtained in the previous time window if required.

In an embodiment, the method may include correlating at a step 111, the current events based on the determination of whether the one or more clusters is present in each of the one or more buckets.

In another embodiment, the at least one current event may be correlated in a real-time manner. In real-time mode of correlation, the cluster may be obtained based on matching rule from the set of predefined rules. To correlate the at least one current event in a real-time manner, the method may include identifying, at a step 113, at least one rule from the set of predefined rules that matches with the at least one current event. Further, the current event features are compared with the consequents of every rule. If a match is found, then the event features are searched for in any of the groups and are added to that group.

Subsequently, the method may include correlating at a step 115, the at least current event with the one or more clusters based on the identified at least one rule. Table 3 depicts real-time correlation based on the matching rules.

TABLE 3

| | CORRELATION | | | |
|---|---|---|---|---|
| Event ID | Rules Considered | Selected Rule | Comments | Cluster |
| 1 | NA | NA | The incoming event is not a part of any of the consequents of pattern | c1 (Node-A - Packet Loss) |

TABLE 3-continued

CORRELATION

| Event ID | Rules Considered | Selected Rule | Comments | Cluster |
|---|---|---|---|---|
| | | | mined rules, hence new cluster created | |
| 2 | NA | NA | The incoming event is not a part of any of the consequents of pattern mined rules, hence new cluster created | c2 (Node-B - IPSLA Packet Loss) |
| 3 | Rn | Rn | The incoming event matched with rn consequent and rn's antecedent is present in c2, hence append to c2 | c2 (Node-B - IPSLA Packet Loss) (Node-G - Interface Down) |
| 4 | r2, r4 | r4 | The incoming event matched with r2 & r4 consequents. All antecedents of rule r2 are present in same cluster and the same in the case of r4. Since r4's confidence is highest, r4 is chosen | c1 (Node-A - Packet Loss) (Node-A - Node Down) |
| 5 | r2, r3, r5, r6 | r6 | Among the rules which match the required criteria, r6's confidence is the highest, r6 is chosen | c1 (Node-A - Packet Loss) (Node-A - Node Down) (Node-C, Interface Down) |

In an embodiment, a new cluster may be generated for the at least one current event if the at least one current event does not match with any of the set of predefined rules. For example, consider event ID 1 in the table 3, where the incoming event feature is not a part of any of the consequents of the plurality of rules, hence new cluster is created.

In an embodiment, at least one rule may be identified if a consequent or an antecedent of the at least one rule matches with the at least one current event. For example, consider the event ID 3 of the table 3, where the event feature is matched with m consequent and rn's antecedent. Hence rule m is identified.

In an embodiment, a plurality of rules from the set of predefined rules may be identified that match with the at least one current event. Thereafter, the confidence score of the identified plurality of rules may be compared. Further, the at least one current event is correlated with the one or more clusters of one of the plurality of the rules having the highest confidence score. For example, consider the event ID 4 in the table 3, the incoming event matched with the consequents of the rule 2 & rule 4. Further, all antecedents of rule r2 are present in the same cluster and the same in the case of r4. Since r4's confidence score is the highest, therefore rule 4 is selected.

Continuing with the above embodiment, the method may include identifying a plurality of rules, from the step of predefined rules, that matches with the at least one current event. The plurality of rules have the same confidence score. The method may include selecting one of the plurality of rules having the highest lift factor. The lift factor is associated with each rule and is indicative of the probability of the consequent and the antecedent occurring together. The method may include correlating the at least one current event with the one or more clusters of the selected rule having the highest lift factor.

Figure 4:
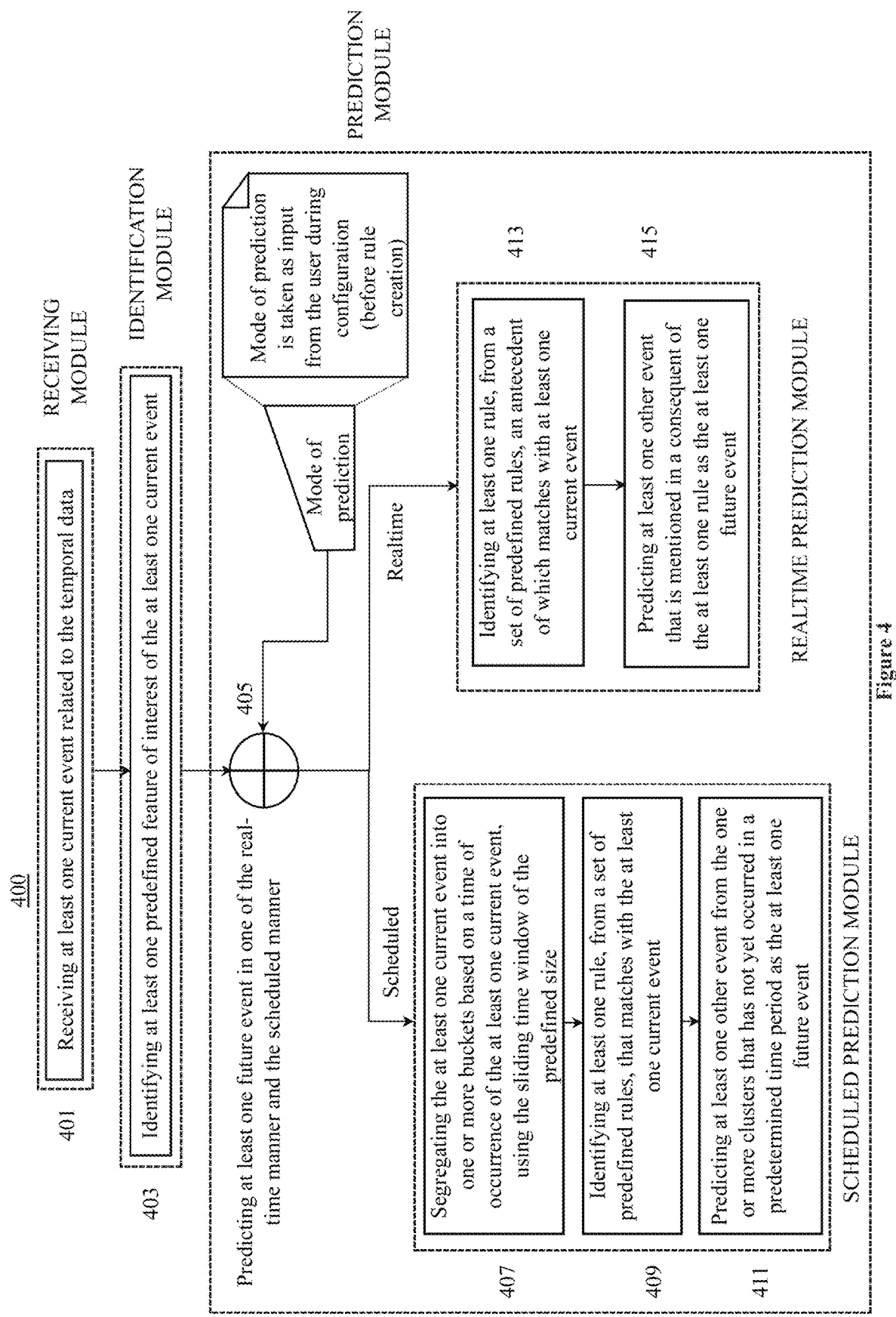
FIG. 4 illustrates a flow diagram depicting a method for predicting a future event, according to an embodiment of the present disclosure.

FIG. 4 illustrates a flow diagram 400 depicting a method for predicting at least one future event, according to an embodiment of the present disclosure. The method may include receiving, at a step 401, at least one current event related to the temporal data. The event may include an alert or incident, or issues. Further, every received event may have various features related to events. For example, if the events are related to an IT field, then the events may have features such as event id, node name, service name, IP address, object type, and other similar associated information. The method may include identifying, at a step 403, at least one predefined feature of interest of the at least one current event. The identified predefined feature may be associated with at least one service node or service name. The method may include predicting at a step 405, at least one future event in one of the real-time manner and the scheduled manner. The mode of prediction (scheduled or real-time) is configured prior to the rule creation.

Moving ahead, when predicting the at least one future event in the scheduled manner, the method may include segregating at a step 407, the at least one current event into one or more buckets based on the time of occurrence of the at least one current event, using the sliding time window of the predefined size. In an embodiment, the one or more events may be segregated in accordance with techniques described in FIG. 2.

In an embodiment, the method may include identifying at a step 409, at least one rule, from a set of predefined rules, that matches with the at least one current event.

Thereafter, the method may include predicting at a step 411 at least one other event from the one or more clusters that has not yet occurred in a predetermined time period as the at least one future event. For every event, pick the cluster in which this event is present, all the other events which are present in that cluster and have not occurred in the past t minutes are predicted to happen. For example, consider cluster 1.

(Node-A, Packet Loss)
(Node-A, Node Down)
(Node-B, IPSLA RTT/Latency)
(Node-X, IPSLA RTT/Latency)

Let's say the event received are (Node-A, Packet Loss) and (Node-A, Node Down) then, looking at cluster 1, the method may predict that (Node-B, IPSLA RTT/Latency) and (Node-X, IPSLA RTT/Latency) are likely to happen within next t minutes.

Moving ahead, wherein predicting the at least one future event in a real-time manner, the method may include identifying at a step 413, at least one rule, from the set of predefined rules, an antecedent of which matches with the at least one current event. Subsequently, the method may include predicting at a step 415, at least one other event that is mentioned in a consequent of the at least one rule as the at least one future event. Table 4 depicts predicting at least one future event in a real-time manner.

TABLE 4

Realtime prediction

| Event ID | Rules Considered | Selected Rule | Comments | Prediction |
|---|---|---|---|---|
| 1 | r2, r4 | r4 | The incoming event is present in the antecedent of r2 & r4. r4 has highest confidence | ['Node-A - Node Down'] |

TABLE 4-continued

Realtime prediction

| Event ID | Rules Considered | Selected Rule | Comments | Prediction |
|---|---|---|---|---|
| 2 | r5, rn | Rn | The incoming event is present in the antecedent of r5 & rn. rn has the highest confidence | [Node G - Interface Down'] |
| 3 | None | None | None of the rules had the incoming event in antecedent | None |
| 4 | r6 | r6 | r6 consists of two antecedents both of which have occurred (alert ids 1 & 4). Hence it is considered | ['Node-C - Interface Down'] |
| 5 | None | None | None of the rules had the incoming alert in antecedent | None |

Figure 5:
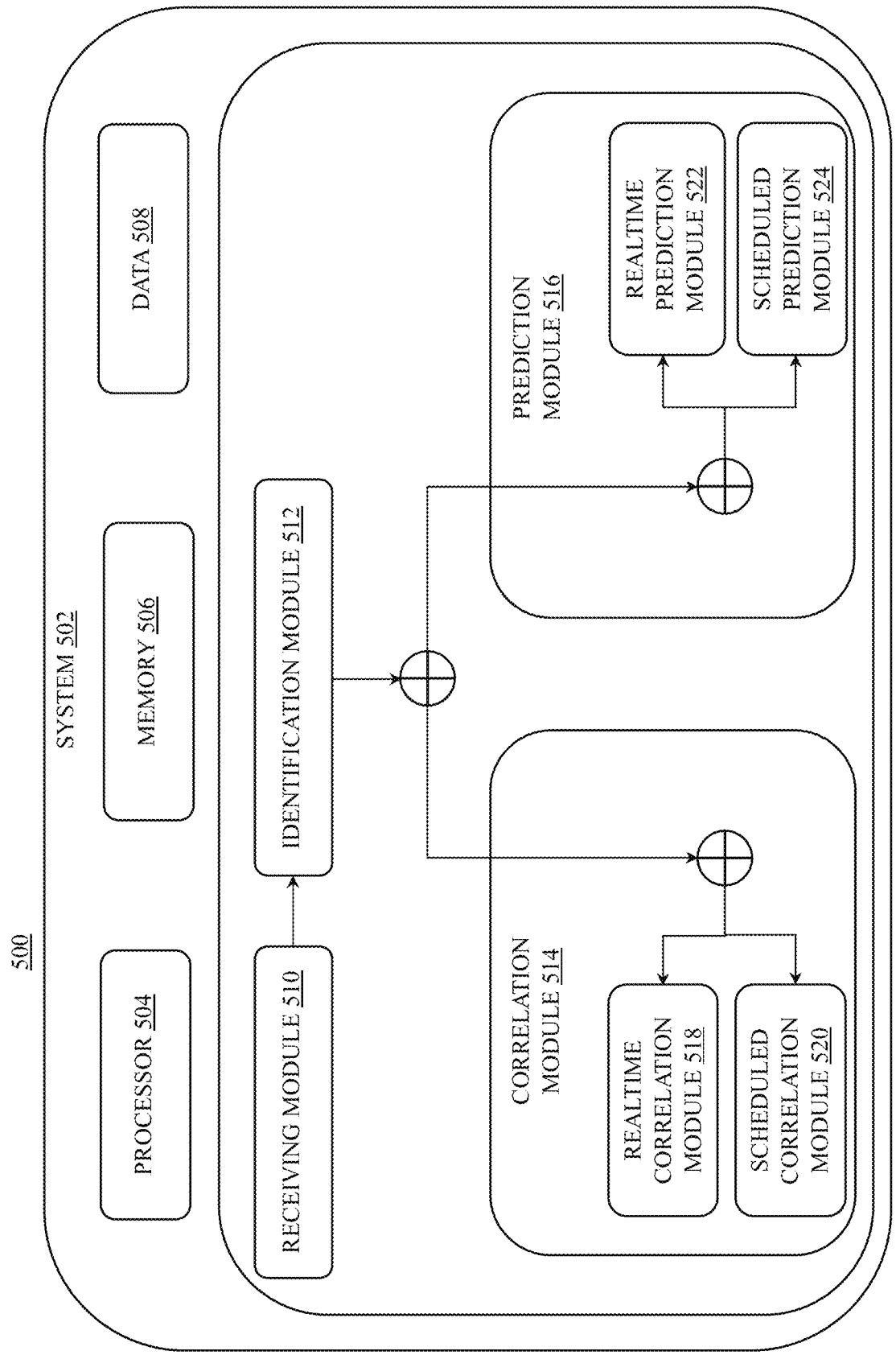
FIG. 5 illustrates a block diagram depicting a system of managing events of temporal data, according to an embodiment of the present disclosure.

FIG. 5 shows a block diagram 500 depicting a system for correlating one or more events of temporal data, according to an embodiment of the present disclosure. The system 502 may include a processor 504, a memory 506, a data 508, a receiving module 510, an identification module 512, a correlation module 514, and a prediction module 516. In an embodiment, the processor 504, the memory 506, the data 508, the receiving module 510, the identification module 512, the correlation unit 514, and the prediction unit 516 be communicatively coupled to one another. At least one of the pluralities of the unit may be implemented through an AI model. A function associated with AI may be performed through the non-volatile memory or the volatile memory, and/or the processor.

The processor 504 may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

A plurality of processors controls the processing of the input data in accordance with a predefined operating rule or artificial intelligence (AI) model stored in the non-volatile memory or the volatile memory. The predefined operating rule or artificial intelligence model is provided through training or learning. Here, being provided through learning means that, by applying a learning technique to a plurality of learning data, a predefined operating rule or AI model of the desired characteristic is made. The learning may be performed on a device itself in which AI according to an embodiment is performed, and/or may be implemented through a separate server/system. The AI model may consist of a plurality of neural network layers. Each layer has a plurality of weight values and performs a layer operation through the calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

As would be appreciated, the system 502, may be understood as one or more of a hardware, a software, a logic-based program, a configurable hardware, and the like. In an example, the processor 504 may be a single processing unit or a number of units, all of which could include multiple computing units. The processor 504 may be implemented as one or more microprocessors, microcomputers, microcontrollers, digital signal processors, central processing units, processor cores, multi-core processors, multiprocessors, state machines, logic circuitries, application-specific integrated circuits, field-programmable gate arrays and/or any devices that manipulate signals based on operational instructions. Among other capabilities, the processor 504 may be configured to fetch and/or execute computer-readable instructions and/or data stored in the memory 506.

For example, the memory 506 may include any non-transitory computer-readable medium known in the art including, for example, volatile memory, such as static random-access memory (SRAM) and/or dynamic random-access memory (DRAM), and/or non-volatile memory, such as read-only memory (ROM), erasable programmable ROM (EPROM), flash memory, hard disks, optical disks, and/or magnetic tapes. The memory 506 may include the data. The data serves, amongst other things, as a repository for storing data processed, received, and generated by one or more of the receiving module 510, the identification module 512, the correlation module 514, and the prediction module 516.

The unit(s) amongst other things, may include routines, programs, objects, components, data structures, etc., which perform tasks or implement data types. The unit(s) may also be implemented as, signal processor(s), state machine(s), logic circuitries, and/or any other device or component that manipulates signals based on operational instructions.

Further, the unit (s) may be implemented in hardware, as instructions executed by at least one processing unit, e.g., processor 504, or by a combination thereof. The processing unit may be a general-purpose processor that executes instructions to cause the general-purpose processor to perform operations or, the processing unit may be dedicated to performing the required functions. In another aspect of the present disclosure, the unit (s) may be machine-readable instructions (software) that, when executed by a processor/processing unit, may perform any of the described functionalities. In some example embodiments, the unit(s) may be machine-readable instructions (software) which, when executed by a processor 504/processing unit, perform any of the described functionalities In an embodiment, the receiving unit 510 may be configured to receive at least one current event related to the temporal data. The event may include an alert or incident, or issues.

In an embodiment, the identification module 512 may be configured to identify at least one predefined feature of interest of the at least one current event. The identified predefined feature may be associated with at least one service node or service name. The event can have a lot of information, and all information may not be always useful. the identification module 512 may be configured to identify the information from the received at least one current event based on a business use case. The identified information is considered a feature of interest. The identification module 512 may be configured to use the identified features of interest for the grouping of events and to predict future ones. For example, an alert has features like the alert message, node name, service name, IP address, etc. but the grouping and prediction can be based on node name and service name. Hence these are considered features of interest. The operation to be performed using the predefined rules (correlation and/or prediction) is configured by the user.

In an embodiment, the correlation module 514 may be configured to correlate the at least one current event with one or more clusters of events based on the at least one predefined feature of interest, in one of a real-time manner and a scheduled manner. Further, the correlation module 514 may include a scheduled correlation module 520 and a Real-time correlation module 518.

In an embodiment, when correlating the at least one current event in the scheduled manner, the correlation module 514 may be configured the segregate the at least one current event into one or more buckets based on the time of occurrence of the at least one current event, using a sliding time window of a predefined size. The correlation module 514 may be configured to perform the segregation using a sliding window. The sliding window is a time window. The correlation module 514 may be configured to determine the window size (t) and step size (Δt) of the sliding window. The correlation module 514 may be configured to put one or more events related to each other into one or more buckets based on the determined window size (t) and step size (Δt) of the sliding window. Thereafter, the scheduled correlation module 520 may be configured to determine the one or more clusters is present in each of the one or more buckets. Further, the scheduled correlation module 520 may be configured to the at least one current event based on the above determination.

In an embodiment, the one or more clusters may be obtained using at least one a similarity matrix and distance matrix for the at least one current event based on a set of predefined rules and using at least one of a community detection technique and a clustering technique. Further, as per the business use case, the clusters created in every time window can be merged with the clusters created in the previous time window if required.

Further, the correlation module 514 may be configured to filter at least one rule from the set of predefined rules based on the at least one current event. The at least one current event is mentioned in one of the antecedents and the consequent of the at least one rule. The correlation module 514 may be configured to generate at least one of similarity matrix and a distance matrix for the at least one current event based on the at least one rule. The correlation module 514 may be configured to identify the one or more clusters for the at least one rule by using at least one of a community detection technique and a clustering technique.

In an embodiment, when correlating the at least one current event in the real-time manner, the correlation module 514 may be configured to identify at least one rule from a set of predefined rules, that matches with the at least one current event. The real-time correlation module 518 may be configured to correlate the at least current event with the one or more clusters based on the identified at least one rule. The correlation module 514 may be configured to determine that the at least one current event does not match with any of the set of predefined rules. The correlation module 514 may be configured to generate a new cluster for the at least one current event based on the determination.

Figure 6:
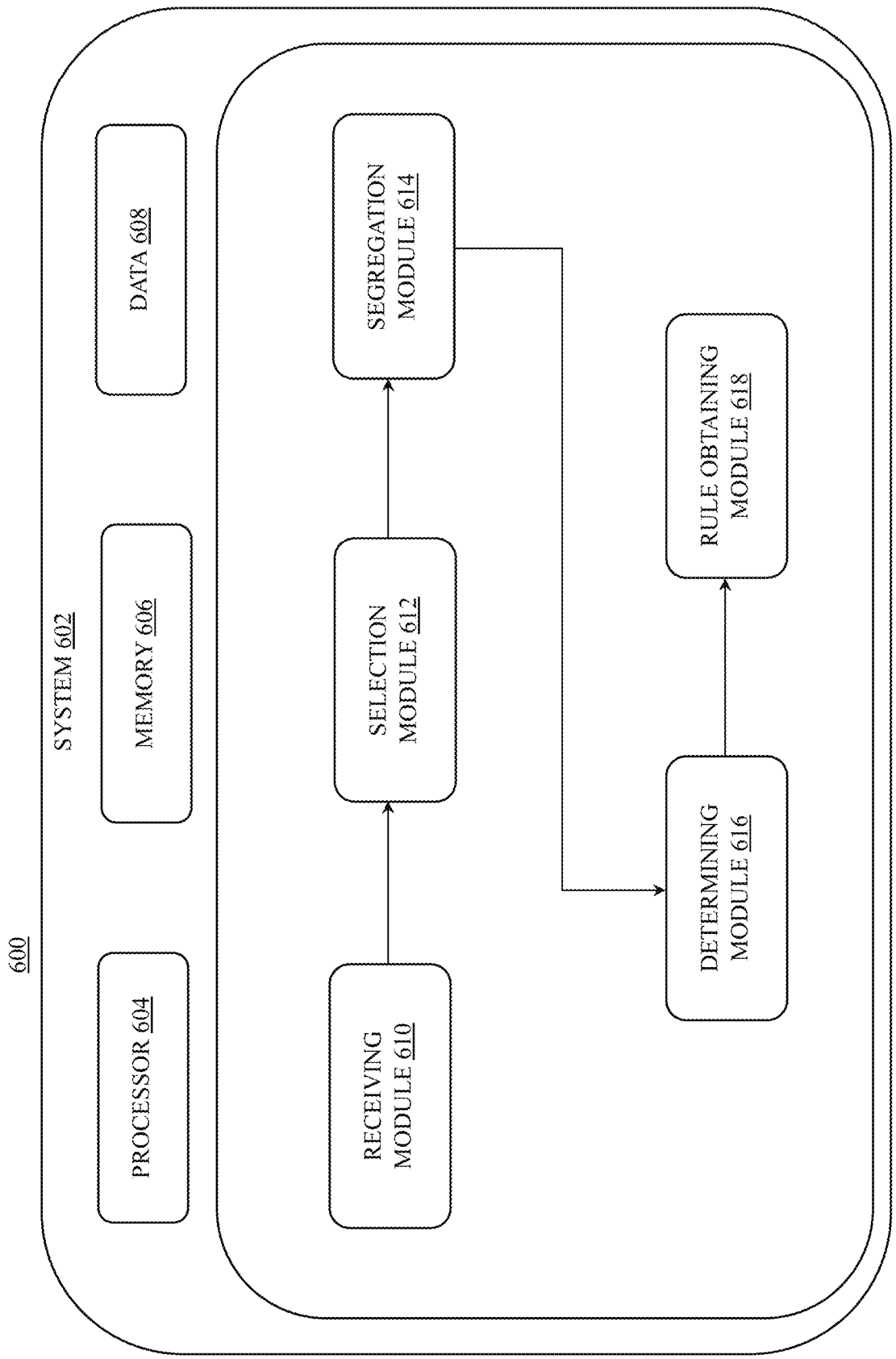
FIG. 6 illustrates a block diagram depicting a system for obtaining a set of predefined rules, according to an embodiment of the present disclosure Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having the benefit of the description herein.

FIG. 6 shows a block diagram 600 depicting a system for obtaining a set of predefined rules, according to an embodiment of the present disclosure. The system 602 may include a processor 604, a memory 606, a data 608, a receiving module 610, a selection module 612, a segregation module 614, a determining module 616, and a rule obtaining module 618. In an embodiment, the processor 604, the memory 606, the data 608, the receiving module 610, the selection module 612, the segregation module 614, the determining module 616, and the rule obtaining module 618 be communicatively coupled to one another. The receiving module 610 may be configured to receive a plurality of historical events related to the temporal data. The selecting module 612 may be configured to select the at least one predefined feature of interest from the plurality of historical events.

The segregation module 614 may be configured to segregate the plurality of historical events into one or more buckets based on the time of occurrence of the historical events, using the sliding time window of the predefined size. The segregation module 614 may be configured to select a size (t) and a step size (Δt) of the time window of the sliding time window. Further, the segregating module 614 may be configured to put events occurring within the same window into a bucket based on the selected size (t) and the step size (Δt). For example, if an event can be related to another one that occurs within a time vicinity of no more than 60 minutes, then the window size would be 60 minutes. Events occurring within window size could be related to one another. The sliding window ensures that all possible relation between events occurring at the end of one window and the ones occurring at the beginning of the next one is captured. Thus, the sliding window ensures continuity. For example, if the window size is 20 minutes, without sliding windows, the event which occurred at, let's say, 18th minute and 22nd minute would be placed in different buckets even though they are only 4 minutes apart.

The determining module 616 may be configured to determine at least one pattern based on the one or more buckets, using a pattern mining technique based on one or more predefined parameters. The one or more predefined parameters may include at least one minimum support and a maximum length of a rule. Further, the minimum support is indicative of a frequency threshold of the rule and the maximum length may be indicative of the maximum number of events involved in the rule. The minimum support may be determined using equation 3

$$\text{support} = \frac{\text{transactions\_where\_items(s)\_occur}}{\text{total\_transactions}} \qquad \text{Equation 3}$$

For instance, there are 100 sequences generated from the historical data, out of which, the sequence {(Node-J, Node Down), (Node-K, Interface Down)} appeared only 2 times, so the support of this sequence is 2/100=0.02. Such infrequent sequence can be avoided from consideration by defining minimum support to the desired value.

The rule obtaining module 618 may be configured to obtain the set of predefined rules from the at least one pattern. The rule obtaining module 618 may be configured to filter the obtained set of predefined rules based on the business use case. The rule obtaining module 618 may be configured to store the filtered set of predefined rules for performing correlation of the current event, and prediction of at least one future event. Further, each of the predefined rules may include at least one of a unique rule identification number, an antecedent, and a consequent.

In an embodiment, the correlation module 514, for identifying the at least one rule when correlating the at least one current event in one of the scheduled manner and the real-time manner, may be configured to determine whether a consequent or an antecedent of the at least one rule matches with the at least one current event. Then the correlation module 514 may be configured to identify the at least one rule based on the determination.

The correlation module 514 may be configured to identify a plurality of rules, from the set of predefined rules, that match with the at least one current event, where each rule has a confidence score that is indicative of a probability of a consequent happening provided that an antecedent has occurred. The correlation module 514 may be configured to compare confidence scores of the plurality of rules. The correlation module may be configured to correlate, based on the comparison, the at least one current event with the one or more clusters of one of the plurality of the rules having the highest confidence score.

The correlation module may be configured to identify a plurality of rules, from the step of predefined rules, that match with the at least one current event. The identified plurality of rules has the same confidence score. The correlation module may be configured to select one of the plurality of rules having the highest lift factor. The lift factor is associated with each rule and is indicative of the probability of the consequent and the antecedent occurring together. The correlation module may correlate the at least one current event with the one or more clusters of the selected rule having the highest lift factor.

In an embodiment, the prediction module 516 may be configured to predict at least one future event in one of the real-time manner and the scheduled manner. The prediction module 516 may include a scheduled prediction module 524 and a Real-time prediction module 522.

In an embodiment, when predicting the at least one current event in the scheduled manner, the prediction module 516 may be configured to segregate the at least one current event into one or more buckets based on the time of occurrence of the at least one current event, using the sliding time window of the predefined size. Thereafter, the prediction module 516 may be configured to identify at least one rule, from a set of predefined rules, that matches the at least one current event. The schedule prediction module 524 may be configured to predict at least one other event from the one or more clusters that have not occurred in a predetermined time period as the at least one future event.

In an embodiment, when predicting at least one current event in a real-time manner, the real-time prediction module 522 may be configured to identify at least one rule from the set of predefined rules, an antecedent of which matches with the at least one current event. Further, the real-time prediction module 522 may be configured to predict at least one other event that is mentioned in a consequent of the at least one rule as the at least one future event.

The system may be configured to group or correlate a given set of events based on patterns periodically mined from the historical data. The system is capable of mining patterns using any pattern mining algorithm. These patterns are then applied over forthcoming events to infer an associated group to which the events belong and the effect of the events on various services, nodes, and other business system elements. The present invention may be extended to handle any kind of temporal data but is not limited to, improving the observability of a system.

The proposed solution may be extended to grouping/prediction of events in any field but is not limited to, grouping/prediction of ailments in healthcare, and crime prediction. The system 502 may be configured to predict the ailments in healthcare. The system 502 may be configured to receive each patient visiting the health care center as an event and symptoms and location as features of interest. The proposed solution can be used to derive the patterns, this will give a broader view required for diagnosis and predict the next possible event.

In another example, the system 502 may be configured to predict the crime. The system 502 may be configured to consider each criminal committing offense as an event and type of crime and location as features of interest. Using the type of crime and location, the proposed solution would be able to find repetitive trends among the mass, thereby predicting probable crimes in the future and taking preventive measures.

In view of the aforesaid, there are provided various advantageous features relating to the present disclosure;
  Domain expertise is not mandatory for initiating grouping/correlation,
  Groups/Correlates the alerts which are functionally related yet textually different, and
  Labeled training data is not required.

Unless otherwise defined, all technical and scientific terms used herein have the same meaning as commonly understood by one of ordinary skilled in the art to which this invention belongs. The system, methods, and examples provided herein are illustrative only and not intended to be limiting.

Embodiments of the disclosure will be described below in detail with reference to the accompanying drawings. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems and any component(s) that may cause any benefit, advantage, or solution to occur or become more pronounced are not to be construed as a critical, required, or essential feature or component of any or all the claims.

While specific language has been used to describe the present subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:

1. A method of managing events of temporal data, after receiving at least one current event, the method comprising:
  receiving, a plurality of historical events related to temporal data;
  selecting at least one predefined feature of interest from the plurality of historical events;
  segregating the plurality of historical events into one or more buckets based on a time of occurrence of the plurality of historical events, using a sliding time window of a predefined size which is determined prior to receiving at least one current event;
  determining at least one pattern based on the one or more buckets, using a pattern mining technique based on one or more predefined parameters, wherein the one or more predefined parameters comprises a maximum length of a rule, and wherein the maximum length is indicative of a maximum number of events involved in the rule; and obtaining a set of predefined rules from the at least one pattern, wherein the set of predefined rules are obtained prior to receiving at least one current event;

receiving the at least one current event related to the temporal data;

identifying at least one predefined feature of interest of the at least one current event;

correlating the at least one current event with one or more clusters of events based on the at least one predefined feature of interest, in one of a real-time manner and a scheduled manner, wherein the one or more clusters are obtained by generating at least one of a similarity matrix and a distance matrix for the at least one current event by using at least one of a community detection technique and a clustering technique, wherein correlating the at least one current event in the scheduled manner comprises:

segregating the at least one current event into one or more buckets based on a time of occurrence of the at least one current event, using the sliding time window of the predefined size which is determined prior to receiving the at least one current event;

determining whether the one or more clusters is present in each of the one or more buckets based on the set of predefined rules which are obtained prior to receiving the at least one current event; and correlating the at least one current event based on the set of predefined rules which are obtained prior to receiving the at least one current event; and wherein correlating the at least one current event in the real-time manner comprises:

identifying at least one rule from the set of predefined rules which are obtained prior to receiving the at least one current event, that matches with the at least one current event; and correlating the at least current event with the one or more clusters based on the identified at least one rule.

2. The method as claimed in claim 1, wherein the one or more predefined parameters further comprises a minimum support of the rule, wherein the minimum support is indicative of a frequency threshold of the rule.

3. The method as claimed in claim 1, wherein segregating the at least one current event and the plurality of historical events using the sliding time window comprising:

selecting a size (t) and a step size (Δt) of the sliding time window; and putting events occurring within the same window into a bucket based on the selected size (t) and the step size (Δt).

4. The method as claimed in claim 1, wherein each of the predefined rules in the set of predefined rules comprising at least one of a unique rule identification number, an antecedent, and a consequent.

5. The method as claimed in claim 4, when correlating the at least one current event in the scheduled manner, comprises:

filtering at least one rule from the set of predefined rules based on the at least one current event, wherein the at least one current event is mentioned in one of the antecedent and the consequent of the at least one rule.

6. The method as claimed in claim 4, comprising:

identifying a plurality of rules, from the set of predefined rules, that match with the at least one current event, where each rule has a confidence score that is indicative of a probability of a consequent happening provided that an antecedent has occurred;

comparing confidence scores of the plurality of rules; and correlating, based on the comparison, the at least one current event with the one or more clusters of one of the plurality of the rules having the highest confidence score.

7. The method as claimed in claim 6, comprising:

identifying a plurality of rules, from the set of predefined rules, that matches with the at least one current event, wherein the plurality of rules have the same confidence score;

selecting one of the plurality of rules having the highest lift factor, wherein a lift factor is associated with each rule and is indicative of a probability of the consequent and the antecedent occurring together; and correlating the at least one current event with the one or more clusters of the selected rule having the highest lift factor.

8. The method as claimed in claim 1, wherein correlating the at least one current event in the real-time manner comprising:

determining that the at least one current event does not match with any of the set of predefined rules; and generating a new cluster for the at least one current event based on the determination.

9. The method as claimed in claim 5, wherein identifying the at least one rule when correlating the at least one current event in one of the scheduled manner and the real-time manner comprises:

determining whether a consequent or an antecedent of the at least one rule matches with the at least one current event; and identifying the at least one rule based on the determination.

10. The method as claimed in claim 1, comprising predicting at least one future event in one of the real-time manner and the scheduled manner, wherein predicting the at least one future event in the scheduled manner comprises:

segregating the at least one current event into one or more buckets based on a time of occurrence of the at least one current event, using the sliding time window of the predefined size;

identifying at least one rule, from a set of predefined rules, that matches with the at least one current event; and predicting at least one other event from the one or more clusters that has not yet occurred in a predetermined time period as the at least one future event; and wherein predicting the at least one future event in the real-time manner comprises:

identifying at least one rule, from the set of predefined rules, an antecedent of which matches with the at least one current event; and predicting at least one other event that is mentioned in a consequent of the at least one rule as the at least one future event.

11. A system for managing events of temporal data after receiving at least one current event, the system comprising:
a processor;

a receiving module configured to receive a plurality of historical events related to temporal data;
a selection module configured to select at least one predefined feature of interest from the plurality of historical events;
a segregation module configured to segregate the plurality of historical events into one or more buckets based on a time of occurrence of the plurality of historical events, using a sliding time window of a predefined size which is determined prior to receiving at least one current event;
a determining module configured to determine at least one pattern based on the one or more buckets, using a pattern mining technique based on one or more predefined parameters, wherein the one or more predefined parameters comprises a maximum length of a rule, and wherein the maximum length is indicative of a maximum number of events involved in the rule; and
a rule obtaining module configured to obtain a set of predefined rules from the at least one pattern, wherein the set of predefined rules are obtained prior to receiving at least one current event; wherein the receiving module is further configured to receive the at least one current event related to the temporal data, wherein identification module is further configured to identify at least one predefined feature of interest of the at least one current even;
correlation module for correlating the at least one current event with one or more clusters of events based on the at least one predefined feature of interest, in one of a real-time manner and a scheduled manner, wherein the one or more clusters are obtained by generating at least one of a similarity matrix and a distance matrix for the at least one current event by using at least one of a community detection technique and a clustering technique,
wherein the processor, the receiving module, the identification module, and the correlation module are communicatively coupled with each other;
wherein for correlating the at least one current event in the scheduled manner, the correlation module is configured to:
segregate the at least one current event into one or more buckets based on a time of occurrence of the at least one current event, using the sliding time window of the predefined size which is determined prior to receiving the at least one current event;
determine whether the one or more clusters is present in each of the one or more buckets based on the set of predefined rules which are obtained prior to receiving the at least one current event; and
correlate the at least one current event based on the set of predefined rules which are obtained prior to receiving the at least one current event; and
wherein for correlating the at least one current event in the real-time manner, the correlation module is configured to:
identify at least one rule from the set of predefined rules which are obtained prior to receiving the at least one current event, that matches with the at least one current event; and
correlate the at least current event with the one or more clusters based on the identified at least one rule.

12. The system as claimed in claim 11, wherein the one or more predefined parameters further comprises a minimum support of the rule, wherein the minimum support is indicative of a frequency threshold of the rule.

13. The system as claimed in claim 11, wherein for segregating the at least one current event and the plurality of historical events using the sliding time window, the segregation module is configured to:
select a size (t) and a step size (Δt) of the sliding time window; and
put events occurring within the same window into a bucket based on the selected size (t) and the step size (Δt).

14. The system as claimed in claim 11, wherein each of the predefined rules in the set of predefined rules comprising at least one of a unique rule identification number, an antecedent, and a consequent.

15. The system as claimed in claim 14, wherein the correlation module, when correlating the at least one current event in the scheduled manner, is configured to:
filter at least one rule from the set of predefined rules based on the at least one current event, wherein the at least one current event is mentioned in one of the antecedent and the consequent of the at least one rule.

16. The system as claimed in claim 14, wherein the correlation module is configured to:
identify a plurality of rules, from the set of predefined rules, that match with the at least one current event, where each rule has a confidence score that is indicative of a probability of a consequent happening provided that an antecedent has occurred;
compare confidence scores of the plurality of rules; and
correlate, based on the comparison, the at least one current event with the one or more cluster of one of the plurality of the rules having the highest confidence score.

17. The system as claimed in claim 16, wherein the correlation module is configured to:
identify a plurality of rules, from the step of predefined rules, that matches with the at least one current event, wherein the plurality of rules have the same confidence score;
select one of the plurality of rules having the highest lift factor, wherein a lift factor is associated with each rule and is indicative of a probability of the consequent and the antecedent occurring together; and
correlate the at least one current event with the one or more cluster of the selected rule having the highest lift factor.

18. The system as claimed in claim 11, wherein for correlating the at least one current event in the real-time manner, the correlation module is configured to:
determine that the at least one current event does not match with any of the set of predefined rules; and
generate a new cluster for the at least one current event based on the determination.

19. The system as claimed in claim 14, wherein for identifying the at least one rule when correlating the at least one current event in one of the scheduled manner and the real-time manner, the correlation module is configured to:
determine whether a consequent or an antecedent of the at least one rule matches with the at least one current event; and
identify the at least one rule based on the determination.

20. The system as claimed in claim 11, comprising:
a prediction module configured to predict at least one future event in one of the real-time manner and the scheduled manner,
wherein for predicting the at least one future event in the scheduled manner, the prediction module is configured to:

segregate the at least one current event into one or more buckets based on a time of occurrence of the at least one current event, using the sliding time window of the predefined size;

identify at least one rule, from a set of predefined rules, that matches with the at least one current event; and predict at least one other event from the one or more clusters that has not occurred in a predetermined time period as the at least one future event; and wherein for predicting the at least one future event in the real-time manner, the prediction module is configured to:

identify at least one rule from the set of predefined rules, an antecedent of which matches with the at least one current event; and predict at least one other event that is mentioned in a consequent of the at least one rule as the at least one future event.

* * * * *